United States Patent [19]
Scholl

[11] 3,759,018
[45] Sept. 18, 1973

[54] U-SHAPED FLUID TREATING FILTER
[75] Inventor: Howard O. Scholl, Louisville, Ky.
[73] Assignee: American Air Filter Company, Inc., Louisville, Ky.
[22] Filed: Apr. 24, 1972
[21] Appl. No.: 246,558

[52] U.S. Cl. ............... 55/487, 55/500, 55/508, 55/511, 161/18, 156/211
[51] Int. Cl. ............................................. B01d 27/00
[58] Field of Search ................. 55/487, 490, 491, 55/493, 495, 497, 499, 500, 501, 502, 504, 508, 511, 514, 519, 527, 528; 210/495, 483; 161/18; 156/211

[56] References Cited
UNITED STATES PATENTS

| | | | |
|---|---|---|---|
| 1,220,888 | 3/1917 | Porter | 55/500 |
| 3,218,784 | 11/1965 | Greiner | 55/491 |
| 3,292,349 | 12/1966 | Cuta | 210/485 |
| 3,320,927 | 5/1967 | Szczepanski | 55/497 |

Primary Examiner—Bernard Nozick
Attorney—Charles G. Lamb et al.

[57] ABSTRACT

An improved air filter of U-shaped configuration including a frame having two longitudinally extending border members and a plurality of transversely extending support members; two of the transversely extending support members being exterior support members disposed at the outer extremity of the filter, one of these exterior support members being at generally the upper extremity of one side of the U-shaped filter and the other exterior support member being at the extremity of the opposite side of the U-shaped filter; two of said transversely extending support members being interior support members disposed at the juncture of each side with the base of the U-shaped frame; the border members being adapted to pivot about the axis of the interior transversely extending support members. The filter further includes mounting means on the exterior transversely extending support members for removably mounting of the filter in an air processing unit.

6 Claims, 5 Drawing Figures

PATENTED SEP 18 1973 3,759,018

U-SHAPED FLUID TREATING FILTER

BACKGROUND OF THE INVENTION

This invention relates to an improved U-shaped fluid treating filter and more particularly, a novel U-shaped frame structure for supporting mats of flexible material in an air processing unit.

In the conditioning of air in air conditioners, furnaces, and the like, the air to be processed is usually passed through filters to remove particles of dust and other foreign materials. These filters come in many sizes and shapes and are constructed by many different methods, the sizes and shapes of these filters being dependent upon each particular processing unit in which they are to be mounted as well as various types and shapes of housings in which these filters are to be received. For example, in one particular air processing unit, a filter of generally U-shaped or hammock style configuration is required. Furthermore, in many of these air processing units, inexpensive filters are utilized wherein the filters may be thrown away when they become clogged or dirty.

SUMMARY OF THE INVENTION

In the present invention, it is recognized that it is desirable to provide a U-shaped filter which is inexpensive, but yet durable, and is adaptable for mounting in present air processing units of the type requiring U-shaped filter assemblies. Furthermore, it is recognized that it is desirable to provide a filter which is easily constructed. Also, it is recognized that the cost of transporting light weight filters from the manufacturer to the point of use is relatively high in comparison to the cost of manufacturing inexpensive throwaway-type filters and that it is desirable to provide a filter of U-shaped configuration which may be transported in a compact or flat condition.

The present invention advantageously provides a straightforward arrangement of an inherently structurally stable filter assembly which may be utilized in air processing units requiring an air filter assembly of U-shaped configuration. The present invention further provides a U-shaped filter assembly which may be shipped in a flat position.

Various other features of the present invention will become obvious to those skilled in the art upon reading the disclosure set forth hereinafter.

More particularly, the present invention provides a generally U-shaped filter assembly adapted to be removably mounted in an air processing unit comprising a U-shaped frame having a base and two side portions including two longitudinally extending border members generally in parallel; two exterior transversely extending support members generally in parallel perpendicular to and in communicative relation with the border members, one of the exterior support members being disposed at one extremity of the frame and the other exterior support member being disposed at the other extremity of the frame; two interior transversely extending support members generally in parallel perpendicular to and in communicative relation with the border members, each of the interior support members being disposed at each junction of the base with each of the sides; the border members being adapted for bending movement about the axis of each interior support member; a mat of flexible filter material substantially coextensive with said frame; and, mounting means attached to the frame adaptable for engagement with mount receiving means in an air processing unit.

It is to be understood that the description of the examples given hereinafter are not by way of limitation and various modifications within the scope of the present invention will occur to those skilled in the art upon reading the disclosure set forth hereinafter.

Referring to the drawing.

Figure 1:
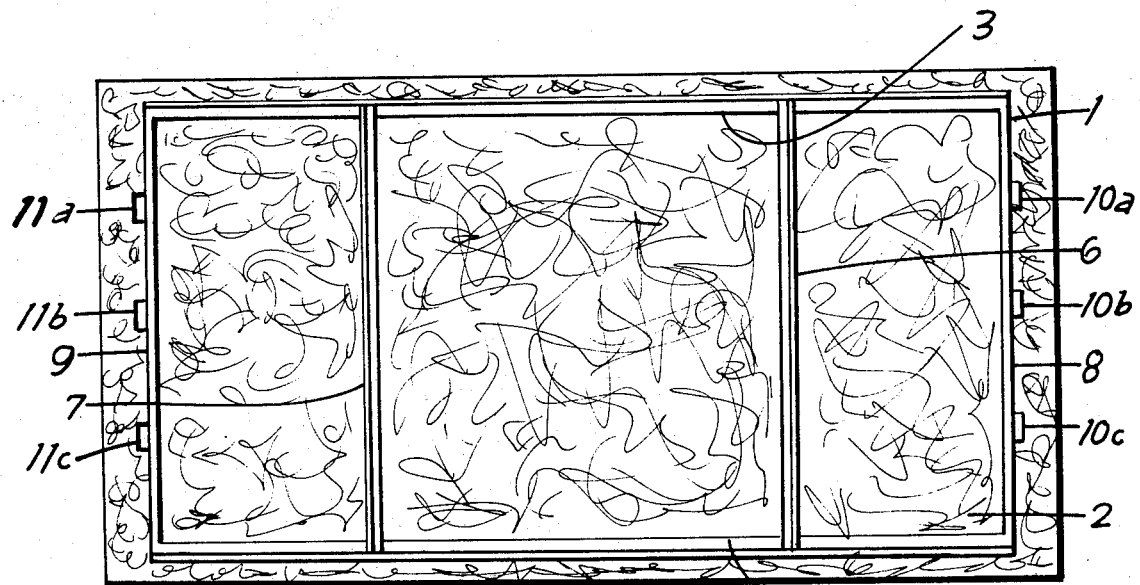
FIG. 1 is a plan view of a filter of the present invention in a flat position.
Figure 2:
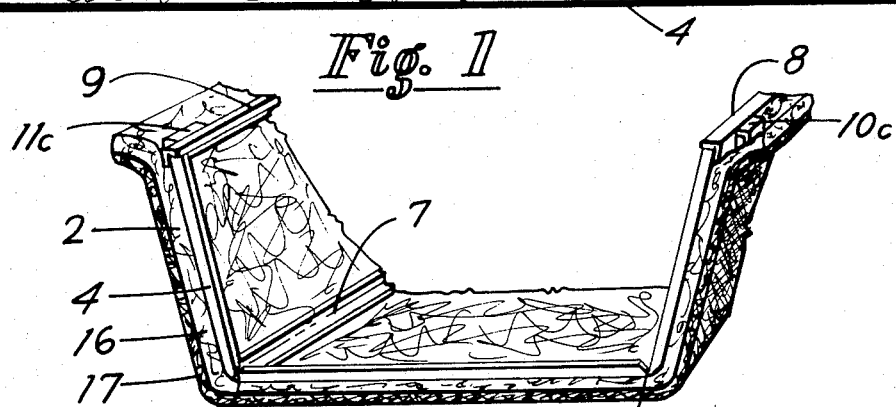
FIG. 2 is a perspective view, partially cutaway, of a filter of FIG. 1 pivoted to a U-shaped configuration.
Figure 5:
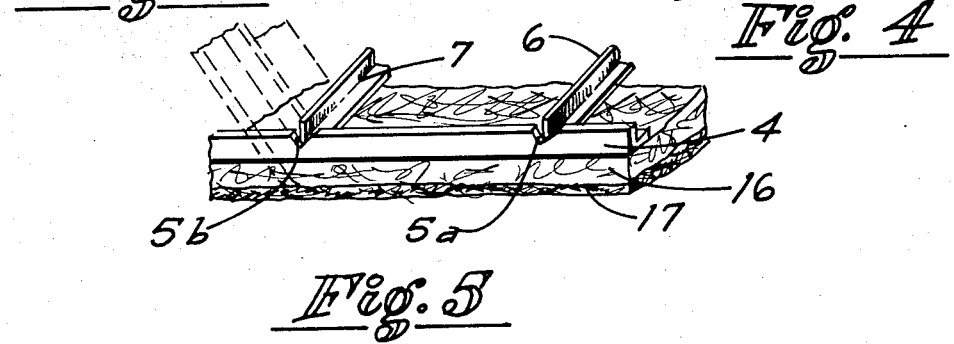

FIGS. 1 and 2 of the drawing illustrate one structure of the U-shaped filter assembly of the present invention. The U-shaped filter assembly illustrated includes a support frame 1 with a mat of flexible material 2, such as fiberglas, attached thereto. Frame 1 includes a pair of border support members 3 and 4 extending longitudinally along the outer edge of the filter assembly. Border support members 3 and 4 are constructed of, for example, angle iron having one leg extending upwardly and the other leg extending inwardly. The border supports 3 and 4 are provided with V-shaped notches therein as illustrated by numbers 5a and 5b in FIG. 5. Longitudinally extending border support members 3 and 4 are of unitary construction and are adaptable for being pivoted or bent into a U-shaped configuration by bending the border support members upwardly at each of the notches, such as, at notches 5a and 5b (FIG. 5). Notches 5a and 5b are at preselected points along the border member 4, the preselected points being the points defining the juncture of the sides of the U-shaped filter with its base. Phantom lines in FIG. 5 illustrate the position assumed by border member 4 upon bending upwardly at the notches 5a and 5b. Figure 2 illustrates the completed filter ready for mounting into a cabinet of an air processing unit wherein the support members 3 and 4 have been bent or pivoted to a U-shaped configuration.

Transversely extending interior support members 6 and 7 are provided for alignment with the notches 5a and 5b of the border support member 4 (FIG. 5) as well as the correspondingly aligned notches (not shown) of border support member 3. Interior support members 6 and 7 are for support of the base portion along the juncture of the base with the sides of the U-shaped filter assembly. It is realized that other base support members may also be included between support members 6 and 7, but in a preferred example this is not necessary since the particular filter media which is to be used will have support characteristics inherent in the construction of the media. One particular media which has been found useful in a filter assembly of the present invention having inherently strong support characteristics will be discussed hereinafter.

Filter frame 1 is further provided with transversely extending exterior support members 8 and 9, each support member being disposed between border members 3 and 4 generally at the ends of the border members 3 and 4 and perpendicular thereto and in communication therewith. The support members 8 and 9 are the exterior ends of the frame 1 and are disposed at generally the outward extremity of each of the sides of the U-shaped filter assembly.

Figure 3:
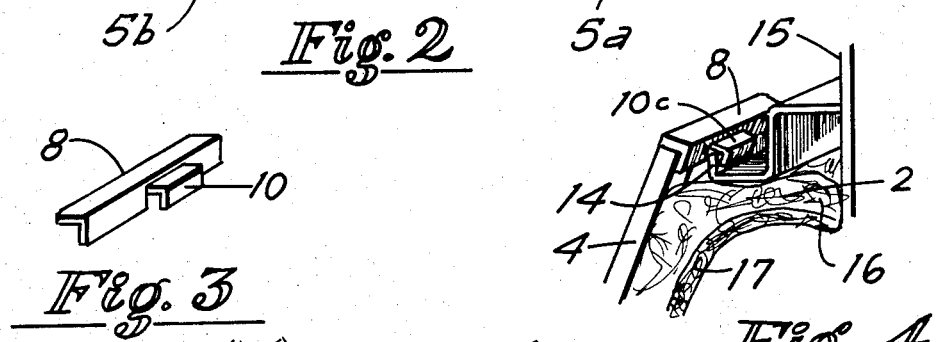
FIG. 3 is an enlarged perspective view, partially cutaway, of a mounting means of an exterior transversely extending support member of FIG. 1.
Figure 4:
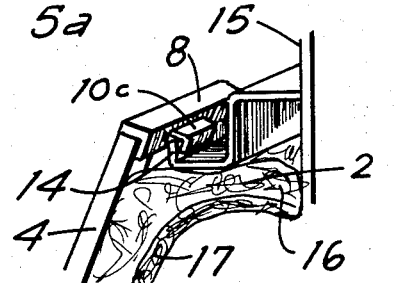
FIG. 4 is an enlarged perspective view, partially cutaway, of the mounting means of FIG. 3 illustrating the mounting of the filter of FIG. 1 in an air processing unit; and, FIG. 5 is an enlarged perspective view, partially cutaway, of the filter of FIG. 1 illustrating the pivot means of border support members about the axis of the interior support members.

Support members 8 and 9 are provided with L-shaped hooks 10 and 11, respectively, hooks 10 and 11 being adaptable for mounting the U-shaped filter assembly in an air processing unit having an upwardly open support channel 14 fixedly suspended from a wall 15 of a housing of an air processing unit. Hooks 10 and 11, as illustrated in FIG. 3, are prepared by cutting at a preselected point a preselected distance upward of a support member such as, support member 8, and then bending outwardly and downwardly a predetermined distance to form a hook of L-shaped cross-section, the L-shaped hook being adapted to mate with the upwardly open support channel 14. The channel 14 is opened at its side end so that an entire filter assembly supported by L-shaped hooks 10 and 11 may be slidably inserted into the channel 14, as shown in FIG. 4.

Filter media 2 of the example is comprised of a first portion or concentration 16 of filaments and a second portion or concentration 17 of filaments. It is realized that filter media 2 may be composed of only one concentration of fibers. However, a preferred fibrous material is one having two portions of different concentrations of filaments wherein the portion having the highest concentration of filaments is sufficient to support the filter in operating position or is at least of a sufficient rigidity to support itself when attached to a filter frame as hereinbefore discussed. One method of making a unitarily constructed fibrous mat having different concentrations of filaments in a plurality of portions is described in U.S. Pat. No. 3,526,557.

In attaching the filter media 2 to the frame 1 this may be accomplished by any known means, such as, for example, an adhesive.

In the manufacture of the filter assembly of the present invention, as described above, the outwardly extending hook means of L-shaped cross-section 10 and 11 are cut at preselected points in support members 8 and 9. V-shaped notches 5 are cut at preselected points along the border support members 3 and 4. Transversely extending support members 8 and 9 are then joined to the border members 3 and 4 at each end of the border members by any known means such as, for example, spot welding. Other longitudinal extending support members, namely, interior support members 6 and 7, are then inserted transversely of the border members 3 and 4 and disposed to align with the previously cut V-shaped notches 5. The filter assembly is then shipped in this flat condition to the point of usage where it is bent or pivoted to a U-shaped configuration by bending border support members 3 and 4 at notches 5a and 5b to form a U-shaped filter assembly.

In order to install the filter assembly into an air processing unit, it is merely necessary to slide the entire assembly transversely into the support channels 14 wherein the hooks 10 and 11 fit inside the upwardly extending support channels 14 and the transversely extending support members 8 and 9 abut against the outside of the channel 14 holding the filter assembly securely in the housing of the air processing units. Removing the filter assembly from the unit is accomplished by merely sliding the filter assembly transversely out of the channel 14. FIG. 4 shows that in operation the filter media 2 extends past the transversely extending exterior support members 8 and 9 so that when installed the fibrous media will fold downward away from the upwardly open support channel 14 and will provide a gas flow-through seal. Thus, it is seen that the filter assembly is positively retained in the air processing unit and may be easily and conveniently removed from the unit when necessary to be replaced.

It will be realized that various changes may be made to the specific embodiment as shown and described without departing from the principal and spirit of the present invention.

What is claimed is:

1. A generally U-shaped filter assembly adapted to be removably mounted in an air processing unit comprising: a frame having an open base and two sides including two longitudinally extending border members generally in parallel; two exterior transversely extending support members generally in parallel, perpendicular to and in connected relation with the border members, one of the exterior support members being disposed at one extremity of said frame and the other exterior support member being disposed at the other extremity of said frame; two interior transversely extending support members generally in parallel, perpendicular to and in connected relation with the border members, each of the interior support members being connected at each junction of said base with each of said sides; said border members including means being adapted for bending movement about the axis of said interior support members;

a mat of flexible filter material substantially coextensive with said frame and attached thereto; and, mounting means attached to said frame adaptable for engagement with mount receiving means in an air processing unit.

2. The generally U-shaped filter assembly of claim 1 wherein said border members include V-shaped notches therein at the juncture of said border members with said interior support members whereby said border members may be bent at the V-shaped notches to form a U-shaped frame.

3. The generally U-shaped filter assembly of claim 1 wherein said mounting means is coextensive with said exterior transversely extending support members, said mounting means being of L-shaped cross-section and adaptable for mating with an upwardly extending support channel which is in communication with a housing of an air processing unit.

4. The generally U-shaped filter assembly of claim 1 wherein said border support members are L-shaped.

5. The generally U-shaped filter assembly of claim 1 wherein said mat of flexible filter material is a fiberglas filter media of unitary construction having two portions of filaments of different concentration.

6. The generally U-shaped filter assembly of claim 5 wherein a first portion of said filter media is in communication with said frame and a second portion of said filter media is spaced from said frame, said first portion being disposed therebetween, said second portion having a concentration of filaments of higher concentration than said first portion.

* * * * *